(12) United States Patent
Qin

(10) Patent No.: US 11,062,617 B2
(45) Date of Patent: Jul. 13, 2021

(54) TRAINING SYSTEM FOR AUTONOMOUS DRIVING CONTROL POLICY

(71) Applicant: Polixir Technologies Limited, Jiangsu (CN)

(72) Inventor: Rongjun Qin, Jiangsu (CN)

(73) Assignee: Polixir Technologies Limited, Jiangsu (CN)

(*) Notice: Subject to any disclaimer, the term of this patent is extended or adjusted under 35 U.S.C. 154(b) by 0 days.

(21) Appl. No.: 16/968,608

(22) PCT Filed: Jul. 12, 2019

(86) PCT No.: PCT/CN2019/095711
§ 371 (c)(1),
(2) Date: Aug. 10, 2020

(87) PCT Pub. No.: WO2020/147276
PCT Pub. Date: Jul. 23, 2020

(65) Prior Publication Data
US 2020/0372822 A1    Nov. 26, 2020

(30) Foreign Application Priority Data

Jan. 14, 2019 (CN) .......................... 201910030302.6

(51) Int. Cl.
| | |
|---|---|
| *G09B 9/05* | (2006.01) |
| *G06N 3/04* | (2006.01) |
| *G06N 3/08* | (2006.01) |
| *G06N 5/02* | (2006.01) |
| *G09B 19/16* | (2006.01) |

(52) U.S. Cl.
CPC .................. *G09B 9/05* (2013.01); *G06N 3/04* (2013.01); *G06N 3/08* (2013.01); *G06N 5/025* (2013.01); *G09B 19/167* (2013.01)

(58) Field of Classification Search
CPC .......... G09B 9/05; G09B 19/167; G06N 3/04; G06N 3/08; G06N 5/025
See application file for complete search history.

(56) References Cited

U.S. PATENT DOCUMENTS

| | | | |
|---|---|---|---|
| 2017/0262790 A1* | 9/2017 | Khasis | .................... G08G 1/012 |
| 2017/0372431 A1* | 12/2017 | Perl | ......................... G07C 5/085 |
| 2018/0048801 A1* | 2/2018 | Kiser | ................. H04N 5/23238 |
| 2018/0164825 A1* | 6/2018 | Matus | .................... B60W 30/00 |
| 2018/0293514 A1* | 10/2018 | Koseki | .................... G06N 7/005 |

(Continued)

FOREIGN PATENT DOCUMENTS

| | | |
|---|---|---|
| CN | 107609633 | 1/2018 |
| CN | 107862346 | 3/2018 |

(Continued)

OTHER PUBLICATIONS

"International Search Report (Form PCT/ISA/210) of PCT/CN2019/095711", dated Oct. 14, 2019, with English translation thereof, pp. 1-4.

*Primary Examiner* — Malina D. Blaise
(74) *Attorney, Agent, or Firm* — JCIP Global Inc.

(57) ABSTRACT

The invention discloses a training system for autonomous driving control policy, which comprises a simulator construction module based on machine learning, a driving control policy search module based on confrontation learning, and a driving control policy model transfer module.

4 Claims, 1 Drawing Sheet

(56) References Cited

U.S. PATENT DOCUMENTS

| | | | | |
|---|---|---|---|---|
| 2018/0373997 A1* | 12/2018 | Duan | ................... | B60W 30/00 |
| 2019/0122378 A1* | 4/2019 | Aswin | ..................... | G06T 5/003 |
| 2019/0146508 A1* | 5/2019 | Dean | ................... | G05D 1/0274 |
| | | | | 701/26 |
| 2019/0163176 A1* | 5/2019 | Wang | ................... | G05D 1/0061 |
| 2019/0212749 A1* | 7/2019 | Chen | ................. | B62D 15/0255 |
| 2019/0266418 A1* | 8/2019 | Xu | ..................... | G06K 9/00798 |
| 2019/0317499 A1* | 10/2019 | Imai | ................. | B60W 50/0098 |
| 2020/0026283 A1* | 1/2020 | Barnes | ................ | G05D 1/0088 |

FOREIGN PATENT DOCUMENTS

| | | |
|---|---|---|
| CN | 108447076 | 8/2018 |
| CN | 109765820 | 5/2019 |

* cited by examiner

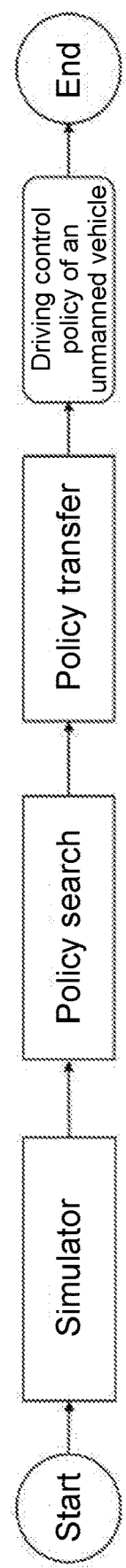

TRAINING SYSTEM FOR AUTONOMOUS DRIVING CONTROL POLICY

CROSS-REFERENCE TO RELATED APPLICATION

This application is a 371 of international application of PCT application serial no. PCT/CN2019/095711, filed on Jul. 12, 2019, which claims the priority benefit of China application no. 201910030302.6, filed on Jan. 14, 2019. The entirety of each of the above mentioned patent applications is hereby incorporated by reference herein and made a part of this specification.

BACKGROUND OF THE INVENTION

1. Technical Field

The present invention relates to a training system for an autonomous driving control policy, which is used to control unmanned devices such as unmanned vehicles, robots and UAV, and belongs to the technical field of autonomous driving.

2. Description of Related Art

Autonomous driving aims to eventually replace drivers from assisting the drivers in driving to realize safe, compliant and convenient personal autonomous traffic systems. In existing autonomous driving systems, most driving control policies are based on manual rule schemes or real-time planning schemes. These existing schemes are not intelligent and have serious defects in realizing safe driving, and an autonomous driving control policy which covers all scenes, especially extreme scenes has not yet been designed.

Recently, machine learning have been introduced into some autonomous driving schemes. Driving data of the drivers are acquired to train a model by supervised learning, so that outputs of the model are similar to human driving habits. However, by adoption of such approach, a large amount of driving data needs to be collected for model training, which involves a lot of human participation; and the large amount of collected driving data includes little extreme scene data, as a result, the model still cannot cover all driving scenes. Consequentially, the model trained by supervised learning has a blind scene area and cannot complete driving tasks smoothly when used in unseen scenes.

Reinforcement learning can improve the decision-making capacity of intelligent agents by performing interactive trial-and-error between the intelligent agents and the environment to make sure that the intelligent agents gradually learn the optimal control policy in the environment to autonomously perform control. However, in the reinforcement learning process, lots of interactive trial-and-error needs to be performed between the intelligent agents and the environment; and in an actual autonomous driving scene, unmanned vehicles are required to perform a large quantity of independent explorations in the physical world. Clearly, such approach is extremely dangerous and costly.

Thus, in autonomous driving tasks, a novel training solution for an autonomous driving policy is urgently needed to solve this problem.

BRIEF SUMMARY OF THE INVENTION

Objective: the present invention provides a training system for generating a safe and autonomous driving control policy to solve the problems in the prior art and to overcome the shortcomings in the prior art.

Technical solution: a training system for an autonomous driving control policy comprises three modules of a construction of a simulator, a policy search, and a policy transfer;

Construction of the simulator: a simulation to static factors such as power systems of vehicles and driving roads as well as a simulation to dynamic factors such as pedestrians, non-motor vehicles, and surrounding vehicles are involved;

Policy search: in a constructed simulator, an objective function is set, and then a driving control policy of the optimal objective function is searched for by means of a machine learning method; wherein, the objective function includes a destination determination value for determining whether or not a vehicle has arrived at a destination, a compliance determination value for determining whether or not the vehicle has violated traffic regulations in the driving process, a safety determination value for determining whether or not the vehicle has been collided in the driving process, and a comfort determination value for determining whether or not the vehicle has excessively accelerated in the driving process, and is obtained by means of weighted summation of all the determination values; and Policy transfer: the policy searched out in the simulator is retrained according to data acquired by an unmanned vehicle entity to obtain a driving control policy used for the unmanned vehicle entity.

The dynamic factors are simulated in the simulator through the following solution:

Firstly, road videos are captured;

Secondly, the dynamic factors in the road videos are detected by means of a manual annotation method or an object detection algorithm;

Thirdly, surrounding information $S(o,t)$ and position information $L(o,t)$ of each dynamic factor o at all times t are extracted, the surrounding information $S(o,t)$ and position movement information $L(o,t)-L(o,t-1)$ are paired, that is, $S(o,t)$ is marked as $L(o,t)-L(o,t-1)$, and a labeled data set including all the dynamic factors at all the times is constructed;

Fourthly, a prediction model H which inputs a prediction value of $S(o,t)$ and outputs a prediction value of $L(o,t)-L(o,t-1)$ is trained from the labeled data set by means of a supervised learning method such as a deep neural network learning algorithm or a decision tree learning algorithm; and Finally, in the simulator, surrounding information $S(o)$ and position information $L(o)$ of each dynamic factor o are extracted, a prediction model $H(S(o))$ is called to obtain a value v, and accordingly, $L(o)+v$ is the next position of the dynamic factor.

In this solution, the prediction model is generated for each dynamic factor and can predict the difference between the current position and the next position of the dynamic factor according to an input state, and accordingly, the dynamic factors have the capability to respond to the environment, and it is unnecessary to keep the road scenes in the simulator completely consistent with the scenes captured in the videos.

Policy Search:

An autonomous driving control policy aims to perform continuous control according to continuously input perceptual information to form a driving process.

Firstly, according to the requirement of a system user for the driving policy, for example, the safety, compliance, and comfort of the vehicle are required to be guaranteed when a vehicle arrives at a driving destination, an objective function is designed;

Secondly, parameters of a policy model are designed, for example, a multi-layer feedforward neural network, a convolution neural network, or a residual network is used as an implementation model of the control policy, and the control policy parameters are determined as connection weights among units of the neural network through training; and Thirdly, as for the objective function, the parameters of the policy model of the maximum evaluation value are searched for by means of an evolutionary algorithm or a reinforcement learning algorithm in a space defined by the parameters of the policy model. The search process generally comprises the following steps:

1. Setting k=0;
2. Generating random control policy parameters to obtain an initial control policy $\pi_k$;
3. Running the initial control policy $\pi_k$ in the simulator to obtain a motion trajectory of an unmanned vehicle in the simulator and to respectively evaluate a destination determination value, a safety determination value, a compliance determination value, and a comfort determination value of the motion trajectory, and adding these values together to obtain a result of an evaluation index after running the control policy;
4. Updating a population by means of the evolutionary algorithm according to the result obtained in Step 3; or, updating a driving policy model by means of a reinforcement learning method;
5. After the update, obtaining a driving policy model to be executed next time, and setting k=k+1; and
6. Repeating Step 2 until all cycles are completed.

Policy Transfer:

[Solution 1] Initialization of a transfer model: A control policy model is run in the unmanned vehicle entity with an autonomous driving control policy model obtained through training in the simulator as a starting point, and is updated by means of obtained data.

[Solution 2] The simulator transition correction and transfer:

Firstly, a control action sequence (a1, a2, a3, . . . , an) is executed on the unmanned vehicle entity, and perception states (s0, s1, s2, s3, . . . , sn) of all executed action are collected;

Secondly, in the simulator, an initial state is set as s0, and the same action sequence (a1, a2, a3, . . . , an) is executed; and perception states (s0, u1, u2, u3, . . . , un) are acquired;

Thirdly, in the simulator, a transition correction function g is constructed, an action a from a current state s and a control policy $\pi$ is input to g, and a correction action a' replacing the action a is output from g and is actually executed in the environment, that is, a'=g(s, $\pi$(s)); and Fourthly, g is trained by means of the evolutionary algorithm or the reinforcement learning method to make sure that the data from the unmanned vehicle entity is similar to data from the simulator as far as possible, that is, $\Sigma_i(si-ui)^2$ is minimized.

After the above-mentioned correction, the control policy $\pi$ obtained through training in the simulator is directly used for the unmanned vehicle entity.

BRIEF DESCRIPTION OF THE SEVERAL VIEWS OF THE DRAWINGS

FIG. 1 is a block diagram of main modules of a training system for an autonomous driving control policy.

DETAILED DESCRIPTION OF THE INVENTION

The present invention is further expounded below in combination with the specific embodiments which are only used to explain the present invention and are not intended to limit the scope of the present invention. After reading the present invention, those skilled in the art can obtain various equivalent modifications of the present invention, and all these equivalent modifications should also fall within the scope defined by the appended claims of the present application.

A training system for an autonomous driving control policy mainly comprises and is technically characterized by three modules including a construction of a simulator, a policy search, and a policy transfer, as shown in FIG. 1.

The construction of the simulator module includes a simulation to static factors such as power systems of vehicles and driving roads as well as a simulation to dynamic factors such as pedestrians, non-motor vehicles, and surrounding vehicles.

The policy search module sets an objective function in a constructed simulator and then searches for a driving control policy of the optimal objective function by means of a machine learning method, wherein the objective function includes a destination determination value for determining whether or not a vehicle has arrived at a destination, a compliance determination value for determining whether or not the vehicle has violated traffic regulations in the driving process, a safety determination value for determining whether or not the vehicle has been collided in the driving process, and a comfort determination value for determining whether or not the vehicle has excessively accelerated in the driving process, and is obtained by means of weighted summation of all the determination values.

The policy transfer module retrains the policy searched out in the simulator according to data acquired by an unmanned vehicle entity to obtain a driving control policy used for the unmanned vehicle entity.

Construction of the static factors, including dynamical models of the vehicles, road models, and so on in the simulator, is mature in the field, and the difficulty in the simulator construction lies in construction of the dynamic factors, which include behavioral models of the pedestrians, the non-motor vehicles, and the surrounding vehicles. Specific implementations for simulating dynamic factors are as follows:

Embodiment 1

Firstly, videos of vehicles, pedestrians, and non-motor vehicles on roads in different scenes are captured by a traffic camera, a high-altitude camera, a UAV, or other devices;

Secondly, the dynamic factors in the road videos are detected by means of a manual annotation method or an object detection algorithm, and the position sequence of each dynamic factor is constructed; and Thirdly, the position sequences of the dynamic factors are played in the simulator to generate a motion trajectory of the dynamic factors.

Embodiment 2

In Embodiment 1, the motion trajectory of the captured dynamic factors is replayed in the simulator, and such approach has the following defects: first, road scenes in the simulator should be consistent with the scenes captured in the videos; and second, the dynamic factors do not have a capability to respond to the environment and are merely replayed. An improved solution based on a machine learning method is described below.

Firstly, the road videos are captured by the traffic camera, the high-altitude camera, the UAV, or other devices;

Secondly, the dynamic factors in the road videos are detected by means of the manual annotation method or the object detection algorithm;

Thirdly, surrounding information S(o,t) (including information of static factors visible at 360° around the dynamic factor, information of the rest of the dynamic factors, and the like) and position information L(o,t) of each dynamic factor o at all times t are extracted the surrounding information S(o,t) is paired with position movement information L(o,t)–L(o,t–1), that is, S(o,t) is marked as L(o,t)–L(o,t–1), and a labeled data set including all the dynamic factors at all the times is constructed;

Fourthly, a prediction model H which inputs a prediction value of S(o,t) and outputs a prediction value of L(o,t)–L(o,t–1) is trained from the labeled data set by means of a supervised learning method such as a deep neural network learning algorithm or a decision tree learning algorithm; and Finally, in the simulator, surrounding information S(o) and position information L(o) of each dynamic factor o are extracted, a prediction model H(S(o)) is called to obtain a value v, and accordingly, L(o)+v is the next position of the dynamic factor.

In this solution, the prediction model is generated for each dynamic factor and can predict the difference between the current position and the next position of the dynamic factor according to an input state, and accordingly, the dynamic factors have the capability to respond to the environment, and it is unnecessary to keep the road scenes in the simulator completely consistent with the scenes captured in the videos.

Policy Search:

An autonomous driving control policy aims to perform continuous control according to continuously input perceptual information to form a driving process.

Firstly, according to the requirement of a system user for the driving policy, for example, the safety, compliance, and comfort of the vehicle are required to be guaranteed when a vehicle arrives at a driving destination, an objective function is designed as a weighted sum of a destination determination value for determining whether or not the vehicle has arrived at the destination, a compliance determination value for determining whether or not the vehicle has violated traffic regulations, a safety determination value for determining whether or not the vehicle has been collided in the driving process, and a comfort determination value for determining whether or not the vehicle has excessively accelerated in the driving process. For example, if the vehicle has finally arrived at the destination within a given time in the driving process, the destination determination value is equal to 1; when the vehicle has been collided, –100 is added to the safety determination value; if the vehicle has violated traffic regulations, –1 is added to the compliance determination value; if the vehicle has excessively accelerated or decelerated, or has driven at a large angular speed, –0.01 is added to the comfort determination value, and finally these values are added together to obtain an evaluation index for marking each driving process.

Secondly, to design parameters of a control policy model, for example, a multi-layer feedforward neural network, a convolution neural network, or a residual network is used as an implementation model of the control policy, it is necessary to further determine, through training, the control policy parameters as connection weights among units of the neural network.

Thirdly, as for the objective function, the policy model parameters of the maximum evaluation value are searched for by means of an evolutionary algorithm or a reinforcement learning algorithm in a space defined by the policy model parameters. The search process generally comprises the following steps:

1. k=0 is set;
2. Random control policy parameters are generated to obtain an initial control policy $\pi_k$;
3. The initial control policy $\pi_k$ is run in the simulator to obtain a motion trajectory of an unmanned vehicle in the simulator and to respectively evaluate a destination determination value, a safety determination value, a compliance determination value, and a comfort determination value of the motion trajectory, and these values are added together to obtain a result of an evaluation index after running the control policy;
4. A population is updated by means of the evolutionary algorithm according to the result obtained in Step 3; or, a driving policy model is updated by means of a reinforcement learning method;
5. After the update, a driving policy model to be executed next time is obtained, and k=k+1 is set; and
6. Step 2 is repeated until all cycles are completed.

Policy Transfer:

[Solution 1] Initialization of a transfer model: A control policy model is run in the unmanned vehicle entity with an autonomous driving control policy model obtained through training in the simulator as a starting point and is updated by means of obtained data.

[Solution 2] The simulator transition correction and transfer:

Firstly, a control action sequence (a1, a2, a3, . . . , an) is executed on the unmanned vehicle entity, and perception states (s0, s1, s2, s3, . . . , sn) of all executed action are collected;

Secondly, in the simulator, an initial state is set as s0, and the same action sequence (a1, a2, a3, . . . , an) is executed; and perception states (s, u1, u2, u3, . . . , un) are collected;

Thirdly, a function g is constructed to correct the deviation of the simulator, an action a=π(s) from a current state s and a control policy π is input to the function g, and a correction action a' replacing the action a is output from the function g and is actually executed in the environment, that is, a'=g(s, a); and Fourthly, g is trained by means of the evolutionary algorithm or the reinforcement learning method to make sure that the data from the unmanned vehicle entity is similar to data from the simulator as far as possible, that is, $\Sigma_i(si-ui)^2$ is minimized.

After the above-mentioned correction, the control policy π obtained through training in the simulator is directly used for the unmanned vehicle entity.

What is claimed is:

1. A unmanned vehicle, comprising a processor, configured to:
   construct a simulator to simulate static factors of power systems of vehicles and driving roads, and dynamic factors of pedestrians, non-motor vehicles, and surrounding vehicles,
   wherein road videos are captured by a road camera, and the dynamic factors are detected in the road videos;

set a driving objective function in the simulator which is constructed, and a driving control policy of an optimal objective function is searched by using a machine learning algorithm; and execute a policy transfer to retrain the driving control policy searched out in the simulator according to data acquired by the unmanned vehicle to obtain a retrained driving control policy used for the unmanned vehicle, and control movement of the unmanned vehicle based on the retrained driving control policy, wherein an execution of the policy transfer comprises:

running a control policy model in the unmanned vehicle with an autonomous driving control policy model obtained through training in the simulator as a starting point, and updating the control policy model by obtained data;

executing a control action sequence (a1, a2, a3, . . . , an) on the unmanned vehicle, and collecting perception states (s0, s1, s2, s3, . . . , sn) of all executed action;

setting an initial state in the simulator as s0, and executing a same action sequence (a1, a2, a3, . . . , an); and collecting perception states (s0, u1, u2, u3, . . . , un);

constructing a transition correction function g in the simulator, inputting an action a from a current state s and the driving control policy π to the g, and outputting a correction action a' replacing the action a from the g and executing the a' in an environment, wherein a'=g(s, π(s)); and training the g by using an evolutionary algorithm or a reinforcement learning algorithm to minimize a difference between data from the unmanned vehicle and data from the simulator, wherein $\Sigma_i(s_i-u_i)^2$ is minimized; and after training the g, obtaining the retrained driving control policy π through training in the simulator, and the retrained driving control policy π is directly used for controlling the movement of the unmanned vehicle.

2. The unmanned vehicle according to claim 1, wherein the processor is further configured to:

extract surrounding information S(o,t) and position information L(o,t) of each dynamic factor o at all times t, pair the surrounding information S(o,t) and position movement information L(o,t)–L(o,t–1), wherein the S(o,t) is marked as the L(o,t)–L(o,t–1), and construct a labeled data set including all the dynamic factors at all the times;

train a prediction model H which inputs a prediction value of the S(o,t) and outputs a prediction value of the L(o,t)–L(o,t–1) from the labeled data set by using a supervised learning algorithm; and extract surrounding information S(o) and position information L(o) of each said dynamic factor o in the simulator, call a prediction model H(S(o)) to obtain a value v, and accordingly, L(o)+v is a next position of the dynamic factor.

3. The unmanned vehicle according to claim 1, wherein an autonomous driving control policy aims to perform continuous control according to continuously input perceptual information to form a driving process, and the processor is further configured to:

design, according to a requirement of a system user for a driving policy, an objective function;

design parameters of a policy model, use a multi-layer feedforward neural network, a convolution neural network, or a residual network as an implementation model of a control policy, and determine control policy parameters as connection weights among units of the neural network through training; and as for the objective function, search for the parameters of the policy model having a maximum evaluation value by using an evolutionary algorithm or a reinforcement learning algorithm in a space defined by the parameters of the policy model.

4. The unmanned vehicle according to claim 3, wherein a search process comprises the following steps:

(1) setting k=0;

(2) generating random control policy parameters to obtain an initial control policy $\pi_k$;

(3) running the initial control policy $\pi_k$ in the simulator to obtain a motion trajectory of an unmanned vehicle in the simulator and to respectively evaluate a destination determination value, a safety determination value, a compliance determination value, and a comfort determination value of the motion trajectory, and adding these values together to obtain a result of an evaluation index after running the control policy;

(4) updating a population by using the evolutionary algorithm according to the result obtained in the Step (3); or, updating a driving policy model by using a reinforcement learning algorithm;

(5) after the update, obtaining the driving policy model to be executed next time, and setting k=k+1; and (6) repeating the Step (2) until all cycles are completed.

* * * * *